US008265630B2

(12) United States Patent
Proctor, Jr.

(10) Patent No.: US 8,265,630 B2
(45) Date of Patent: *Sep. 11, 2012

(54) ANTENNA ADAPTATION TO MANAGE THE ACTIVE SET TO MANIPULATE SOFT HAND-OFF REGIONS

(75) Inventor: James A. Proctor, Jr., Melbourne Beach, FL (US)

(73) Assignee: IPR Licensing Inc., Wilmington, DE (US)

( * ) Notice: Subject to any disclaimer, the term of this patent is extended or adjusted under 35 U.S.C. 154(b) by 970 days.

This patent is subject to a terminal disclaimer.

(21) Appl. No.: 11/520,132

(22) Filed: Sep. 13, 2006

(65) Prior Publication Data

US 2007/0123262 A1 May 31, 2007

Related U.S. Application Data

(63) Continuation of application No. 10/386,392, filed on Mar. 10, 2003, now Pat. No. 7,113,786.

(60) Provisional application No. 60/363,227, filed on Mar. 8, 2002.

(51) Int. Cl.
*H04W 4/00* (2009.01)
*H04B 3/46* (2006.01)

(52) U.S. Cl. ........................................ 455/442; 375/224

(58) Field of Classification Search .................. 455/522, 455/442, 151.1, 277.1; 370/203, 208, 209, 370/441, 342, 332; 450/550; 375/224
See application file for complete search history.

(56) References Cited

U.S. PATENT DOCUMENTS

| | | | |
|---|---|---|---|
| 5,267,261 A * | 11/1993 | Blakeney et al. ............. | 370/332 |
| 5,577,022 A | 11/1996 | Padovani et al. | |
| 5,953,325 A * | 9/1999 | Willars ........................ | 370/335 |
| 6,055,428 A * | 4/2000 | Soliman ....................... | 455/437 |
| 6,229,486 B1 | 5/2001 | Krile | |
| 6,233,455 B1 * | 5/2001 | Ramakrishna et al. ....... | 455/437 |
| 6,304,755 B1 | 10/2001 | Tiedemann, Jr. et al. | |
| 6,353,601 B1 | 3/2002 | Siira | |
| 6,370,369 B1 | 4/2002 | Kraiem et al. | |
| 6,381,458 B1 * | 4/2002 | Frodigh et al. ............... | 455/442 |
| 6,456,652 B1 * | 9/2002 | Kim et al. .................... | 375/224 |
| 6,459,895 B1 | 10/2002 | Hastings et al. | |
| 6,594,243 B1 * | 7/2003 | Huang et al. ................. | 370/332 |
| 6,697,610 B1 | 2/2004 | Tait | |
| 6,795,409 B1 | 9/2004 | Youssefmir et al. | |
| 6,900,775 B2 | 5/2005 | Shapira | |
| 7,411,899 B2 * | 8/2008 | Kavak et al. .................. | 370/209 |
| 7,499,391 B2 * | 3/2009 | Cleveland .................... | 370/203 |
| 2002/0137538 A1 * | 9/2002 | Chen et al. ................... | 455/550 |
| 2002/0146029 A1 * | 10/2002 | Kavak et al. ................. | 370/441 |

FOREIGN PATENT DOCUMENTS

WO  WO/00/31993  6/2000

\* cited by examiner

*Primary Examiner* — Kent Chang
*Assistant Examiner* — Kuo Woo
(74) *Attorney, Agent, or Firm* — Volpe and Koenig, P.C.

(57) ABSTRACT

A method of managing the number of base station engaged in soft hand-off in a mobile communication system. The method involves manipulating a subscriber based directional antenna so as to control the number of base transceiver stations, pilot channels, beacon signals or other signals detected to be used in soft hand-off processing. The adaptive antennas are modified to manage the number of active set members, such as by manipulating direction, beamwidth, or other antenna parameters.

10 Claims, 6 Drawing Sheets

ANTENNA ADAPTATION TO MANAGE THE ACTIVE SET TO MANIPULATE SOFT HAND-OFF REGIONS

RELATED APPLICATION

This application is a continuation of U.S. application Ser. No. 10/386,392, filed Mar. 10, 2003, which claims the benefit of U.S. Provisional Application No. 60/363,227, filed on Mar. 8, 2002. The entire teachings of the above application are incorporated herein by reference.

BACKGROUND OF THE INVENTION

The present invention relates to managing the number of remote wireless communication units that are performing hand-off, by using directional antennas.

Many types of wireless communications systems such as cellular mobile radio telephone systems and emerging wireless data communication systems provide continuous radio coverage within a geographic area using a number of fixed site transceivers such as base stations or wireless access points. Continuous operation, or at least the appearance thereof, is maintained by automatic transfer, or "hand-off", of a wireless connection from one site to another as a mobile unit travels around the area.

In urban areas, and in locations with natural obstructions, it is common for radio signals to arrive at a receiver with reflections from nearby objects such as buildings or hills. This can occur along the so-called forward direction, radio path from the fixed cite to the remote unit receivers, as well as in a reverse direction, from the remote units to the fixed site receivers. In either case, the received signal strength can vary substantially as a result of the terrain. Thus hand-off decisions based on simple signal quality measurements do not necessarily follow the same boundaries as the designed cell site boundaries. For example, a remote unit located within the shadow of an obstructing building produces a signal which has significantly decreased, as though that remote unit has indeed traveled outside the cell. A hand-off would therefore be typically initiated by the fixed site. A second hand-off process would again occur once the remote unit moves to a position clear of the obstruction. Indeed, it is as if cell boundaries are rather indistinct.

Additional anomalies occur in other locations, such as at the top of a hill, where a particular mobile unit may be visible to many different base stations. In such position line of site propagation may be available for reliable connections to be made to several base stations causing each such base station to begin to initiate soft hand-off procedures with the single mobile unit.

In digital wireless communications systems, such as those based on Code Division Multiple Access (CDMA) modulation techniques (e.g. IS-95, IS-2000, W-CDMA, and the like), a soft hand-off procedure is used. In this procedure, each mobile unit simultaneously maintains a connection with two to three base stations. As the mobile unit moves from a current cell (source cell) to the next cell (target cell) a traffic channel connection is simultaneously maintained with both cell site base stations. On the forward link, the two signals are combined to yield a composite signal of better reliability. On the reverse link, the mobile unit transmit signal is received by both cell site stations. The two cells demodulate the signals separately, sending the demodulated frames back to a centralized Mobile Switching Center (MSC). The MSC determines the best frame received out of the two that are sent back.

A so-called "softer" hand-off procedure occurs when a mobile unit transitions between two different sectors of the same cell. On the forward link, the mobile performs the same kind of combining process as for soft hand-off. On the reverse link however, the signals from the two sectors are simultaneously received at the same cell site. The signals are demodulated and combined inside the base station associated with that cell, and only one frame is sent back to the MSC.

It is important to note that each sector in a CDMA system is distinguished form the other sectors by a pilot channel code associated with that sector. The pilot channel signals are typically defined by short Pseudo Noise (PN) codes with a specific code phase offset assigned to each sector. A pilot channel serves as a beacon for that sector, and the associated base station aids the mobile in its acquiring other logical channels associated with that same sector.

In both soft hand-off and softer hand-off processing, the mobile unit is an intimate participant in the process. On requirement it has per the above-mentioned standards is to constantly notify the base station regarding its local propagation conditions, by sending Pilot Signal Measurement Messages. The MSC may then make use of this information to make hand-off decisions. This Mobile Assisted Hand-off (MAHO) process requires that the mobile maintain in memory certain lists of base station sectors identifiers and parameters. Sectors are identified in the form of pilot channel identifiers for the sectors. The so-called active set list contains the pilot channel identifiers of those base stations or sectors that are actively communicating with the mobile. If the active set contains more than one pilot channel, then that mobile is maintaining multiple connections on separate traffic channels. In most CDMA systems, the active set can contain up to six pilot channels. A pilot can only be added to the active set if the base stations send a hand-off direction message to the mobile and that message contains a particular pilot channel to be added to the active set.

Soft hand-off capability has been a welcome advance in the field of cellular communication since it encourages the seamless interconnections of calls as a mobile unit travels from sector to sector. However, soft hand-off does not come without a price. While soft hand-off improves the reliability for users in weak signal conditions, such as when they are located on the boundary of a cell or in the shadow behind a building, unfortunately the technique also ends up being used in situations where many signals are available but where connection reliability is not an issue. For example, a mobile unit located on a tall hill may often have good line of sight propagation to several base station sectors. However, using standard hand over processing, each visible sector will be added to the active set, thus tying up traffic channels. This is despite the fact that each individual sector is alone sufficient to maintain reliable communications. However, soft hand-over procedures continue to be utilized due to the fact that more than one sector can be seen by the mobile unit.

In fact, wireless service providers have been making significant efforts towards eliminating excessive soft hand-off where they can find such regions in their networks. They do this by periodically manipulating the point angle of base station antennas, the transmit power of base station power amplifiers and/or the height of antennas in the area adjacent hills. This optimization, which requires significant engineering by human beings, has a goal of increasing capacity by reducing the areas of overlapping signal coverage.

More information on soft hand-over procedures can be found in the book by Yang, S. C. *CDMA RF System Engineering* (1998 Artec House, Inc., Norwood, Mass.) pages 94-103.

SUMMARY OF THE INVENTION

The present invention relates to using an adaptive antenna such as a directional antenna to provide increased capacity by manipulating measurements made during a soft hand-off process. In particular, base station or sector parameters as stored in an active set are first compared. A member of the active set is determined to have a very good, that is strong signal, and is labeled as a primary base station or sector. The other active set members are reduced and/or removed from the active set through the expedient of manipulating the antenna settings.

More specifically, various criteria are used to determine the reliability of Base Transceiver Station (BTS) pilot channel signals received from multiple base stations in the active set. A determination is made if one, or a subset of these pilot signals, is sufficient to maintain a reliable connection without the need for any of the others in the set. Upon determining a list of unnecessary signals, the remote antenna array is then manipulated by the mobile to reduce the strength of one or more of the unnecessary pilot signals. This can be accomplished for example by steering the antenna away from one or more of the unnecessary pilot signals, and steering in the direction of one of the primary pilot signals. It can also be done by broadening or narrowing the beamwidth of the antenna.

The reliability of a particular member of the active set can be determined in a number of ways. In a preferred embodiment, this involves measuring how close a signal is to a noise floor composed of interference from other sectors and thermal noise. Measurements on the pilot signal can include Received Signal Strength Indication (RSSI), a correlated power ($E_c$) measurement, estimated noise based upon calculations and/or estimated noise floor. Variations on these measure of signal strength, correlated power, or signal to noise ratio (SNR) may be used.

Other refinements may be used. For example, if pilot signals are received from three base stations at approximately the same moderate reliability level, two of the base stations that are located in a same general direction might be selected and the antenna steered in their direction. This will cause the third base station, which is in a relatively opposite direction, to be de-selected from the active set, even when its reliability or strength might be the same and/or slightly greater than the other two pilot signals.

In further embodiments the process involves a step of forcing a pattern change to maintain an adequate number of members in the active set. In particular, when most or all of the active set are deemed to be unreliable, the antenna is steered in other directions. This can typically cause additional pilot signals to become visible. These may include new base stations signals of different or additional paths for the currently active base station. The steering or re-steering of the array typically continues until reliable signals are detected and determined.

Even in a situation where members of the active set are unreliable, but still meet a lower, but sufficient quality metric, it may be desirable to keep the other base stations active. In this scenario a process can proceed as follows The array can be steered to a new position or pattern while ensuring that the criteria for removing a base station from the active set is not satisfied. This can be done typically by steering the antenna slightly away from its present state to cause a received signal to drop below a threshold for a predetermined duration of time ($T_{drop}$). If no better pilot channel is then added to the active set, an assumption can be made that the best candidates are still members of the active set.

In other aspects, if the number of stations in the active set is insufficient, the pattern can be modified with a goal of adding new candidate stations to the active set. For example, the antenna pattern may be modified, such as by broadening its beamwidth to permit the reception of additional pilot channel signals transmitted by other base stations in the area. The pattern can be broadened through a series of steps until a sufficient number of members are added to the active set.

In yet another aspect, specific directions or patterns can be further manipulated to reduce the list of active set members. For example, if the receiver has an adequate list of reliable connections, the beam width can be narrowed in order to keep the active set list to a manageable number.

As will be understood after the reading following detailed description, the present invention allows an increase in capacity of existing mobile wireless communication networks without changing infrastructure elements such as base transceiver stations, base station controllers, towers, access points, central antennas and the like. The only modifications necessary are made to the mobile subscriber units. For example, modifications can be made to wireless handset control chips and antennas without modifying cell site towers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of a preferred embodiment of the invention follows.

Figure 1:
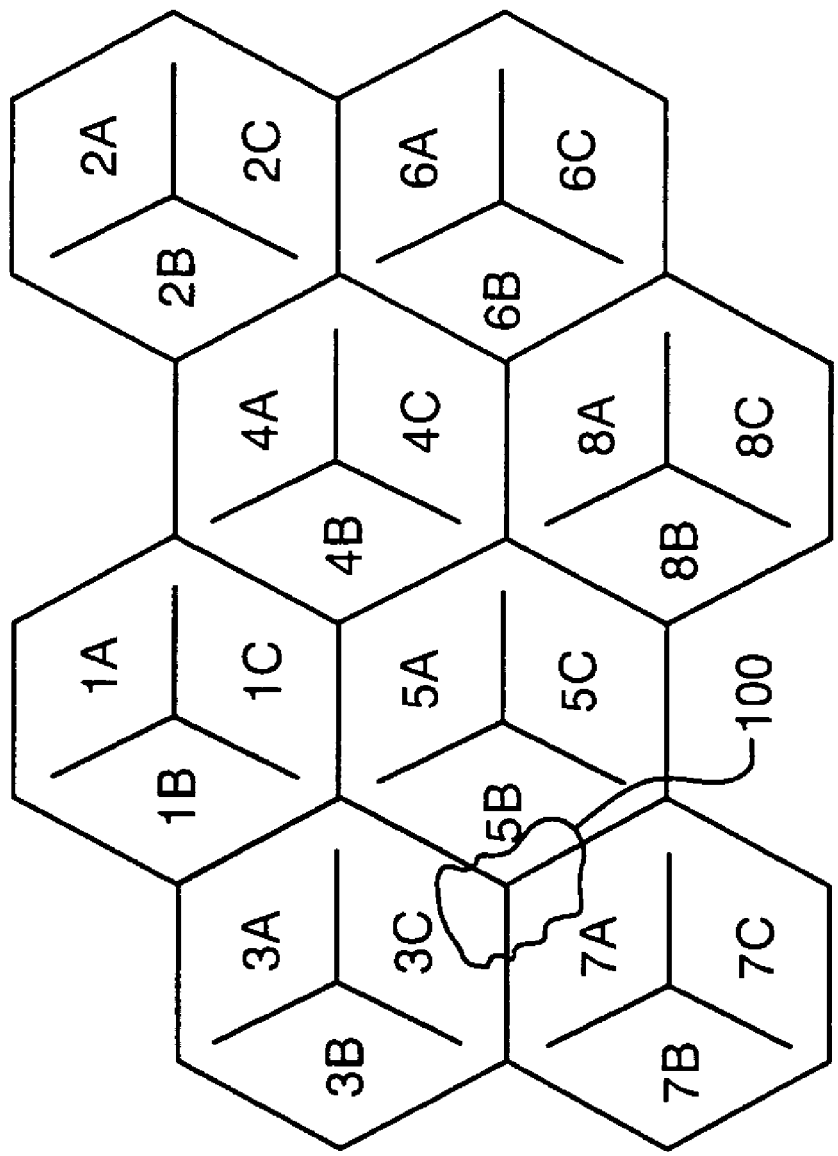
FIG. 1 illustrates a typical sector and cell site topology.

Turning attention now to the drawings, FIG. 1 illustrates an ideal wireless network topology including cells and sectors. A specific region in which wireless coverage is desired to be provided it is divided into sub-regions or cells. Radio equipment in each cell, known as a Base Transceiver Station (BTS) is responsible for modulating and demobility signals, and making connections. The pattern is typical of a cellular communications system such as the IS-95 and CDMA 2000 mobile telephone systems now prevalent in the United States that makes use of Code Division Multiple Access (CDMA) modulation. However, the pattern can also be typical of other types of wireless networks such as Wireless Local Area Networks (WLANs) and the like. In these systems, there still is centrally located radio equipment, although it is known by other names such as an "access point" or a "wireless hub".

In the illustrated example, the antennas associated with Base Transceiver Stations in each cell site are arranged into 120° sectors. The sectors are labels A, B, or C. Each of the cells is given an ordinal number in the figure, for example, 1, 2, 3, 4, 5, etc. Accordingly, each sector has an associated number and letter, such as the sector label "3C".

As a particular user moves from the coverage area of one sector to the coverage area of another sector, a hand-off must occur to transition the communication link from one cell to the next. Most modern mobile communication systems support different types of hand-off processes. Common in CDMA systems is a so-called soft hand-off process. During this process a mobile unit must simultaneously maintain connection with two or three BTSs associated with, respectively, two or three sectors. As the mobile moves from its current cell to the next cell, a traffic channel connection is simultaneously maintained with both cells. Thus, for example, a mobile unit moving from sector 3C to sector 7A will maintain a connection with at least two BTSs. If the mobile unit should be in a location adjacent where intersection with sector 5B occurs, a connection will also be maintained with sector 5B as well.

For forward link communications, that is, from the BTS out to the remote mobile unit, the multiple signals are combined to yield a composite received signal of better quality. On the reverse link, that is, for transmission from the mobile units back to the BTSs, the signal is received by the multiple BTSs. Each BTS needs to demodulate the signal separately, sending the demodulated frames back to a Mobile Switching Center (MSC). The MSC contains a selector that selects the best frame out of the two that are sent back.

Other processing, such as so-called soft hand-off processing, may also take place. This occurs when a mobile unit moves transitions between two different sectors served by the same BTS. On a forward link, the mobile can perform the same kind of combining process as it performed for soft hand-off. In this case, the mobile uses its receiver processor to combine signals received from two different sectors. On the reverse link, however, the same BTS will simultaneously receive two signals from the mobile unit. The two signals are demodulated and combined inside the BTS associated with the particular cell, and only one frame is sent back to the MSC.

Recent studies have shown that in a typical CDMA system, soft hand-off processing results in at least three channel connections typically maintained per active mobile unit. This figure includes a range of users, from those located close to the center of a cell (for which a single connection is sufficient), to those located adjacent to the intersection of other cells. Such outlying mobile units need to maintain three connections, one for each nearby sector, each connection using two way softer hand-off channels, resulting in the possibility of maintaining as many as six simultaneous connections. These multiple connections utilized in soft hand-off processing are maintain in a list in the mobile unit, known as the active set list.

Figure 2A:
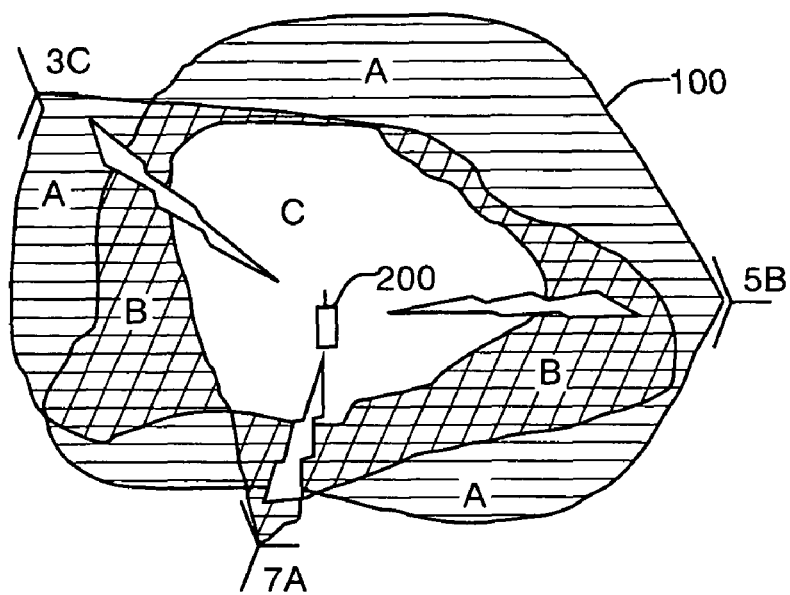
FIG. 2A shows typical overlap of sector coverage among three sectors and how different active set assignments will occur for different mobile unit location.

FIG. 2A is a more detailed view of typical situation, showing how coverages from three sectors may overlap in a region such as region 100 of FIG. 1. Here a mobile unit 200 is located in an area adjacent to base stations 3C, 5B, and 7A. CDMA standards such as IS-95 and IS-2000 and the like require that signals detected with sufficient energy be reported by the mobile unit 200 to the BTSs, and added to the active set. In particular, these and similar systems, the mobile unit becomes an intimate participant in making decisions with regard to soft hand-off. The mobile unit is required to constantly notify base stations in its area regarding the local propagation conditions. The BTSs then make use of this information to make hand-off decisions.

More particularly, these Mobile Assisted Hand-Off (MAHO) procedures require that the mobile unit 200 make a measurement of the forward link energy per chip with respect to a noise measurement ($E_c/I_o$) energy per chip measurement is with reference to the pseudo-noise sequence that is used to spread the CDMA coded pilot channel signal. This pilot channel measurement result must be then reported back to the base station. Since each base station transmits its own pilot code on a different PN code offset, the $E_c/I_o$ of a pilot channel gives a good indication of whether or not a particular sector is the best candidate to be the serving sector for a particular mobile unit 200.

In managing the hand-off process, the mobile unit 200 maintains in its memory a number of different lists of pilot channel measurements for different base stations. This list, is the so-called the active set, contains an identification of the pilot channels of those sectors that are actively communicating with the mobile unit on traffic channels. If the active set contains only one pilot channel for example, then the mobile is probably located close to the center of a cell and is not performing soft hand-off. However, if the active set contains more than one pilot channel, then the mobile 200 is maintaining a connection with all of those sectors on separate traffic channels.

In the standard processing the base station ultimately controls the hand-off process, because a pilot can only be added to the active set if the MSC sends a hand-off direction message to the mobile unit, with that message containing the particular pilot to be added to the active set.

The mobile 200 also typically keeps other sets to manage the hand-off process. For example, a "candidate set" contains those pilots whose energy per chip are sufficient to make them future hand-off candidates. If the energy per chip of a detected pilot channel is greater than a pilot detection threshold for a predetermined time period ($T_{ADD}$), then that pilot will be automatically added to the candidate set. A pilot is removed from this set and placed in the "neighbor set" if its strength drops below a pilot drop threshold, such as for more than duration specified by a hand-off drop timer ($T_{DROP}$).

FIG. 2A is a typical situation. As can be seen from the plot, specific areas associated with coverage of a particular sector does not follow an exact 120° arc, but rather are modified by the surrounding natural topography. Mobile units located in areas labeled A (as shaded in the diagram) typically "see" only one base station and thus have only one sector listed in their active set. But, mobile units 200 located in the areas labeled B are within the range of two sectors, and thus will have two members in their active set. When a mobile unit is located in the region labeled C, it may have three or possibly even more sectors listed in its active set, indicating that three or greater connections are being maintained for that mobile unit.

Soft hand-off processing greatly improves reliability for mobile unit in weak signal conditions. This may occur, for example, in the middle of region C, where hand-off is likely to occur between base station sectors. However, mobile units in this location tend to utilize channel resources unnecessarily, even where reliability is not an issue. For example, mobiles located in most of region B may unnecessarily tie up two channels. If the region 100 was located on a tall hill where a line of site propagation is very reliable and available to any of the 3C, 5B, and 7A, each sector will still be connected in soft hand-off utilizing traffic channels. However, each individual signal would very well itself be enough to maintain reliable communication. In this situation, the channel resources allocated to maintaining soft handover processing are not related to any true requirement for maintaining reliable communications.

Indeed, in the past, the operators of wireless systems often put significant effort into eliminating the existence of B and C areas shown in FIG. 2A. They have done this by manipulating the pointing angle of base station sector antennas, reducing the transmit power of base station amplifiers, and/or reducing the height of their transmit antennas. This optimization has a goal of increasing capacity by reducing the coverage area of individual sector BTS equipment. However, this requires much advanced engineering, for example, detailed knowledge of the physical topology of the surrounding area, sophisticated software modeling planning tools, and other field measurement resources. It would be desirable if this situation could be improved automatically, by somehow making modifications to the mobile unit 200 itself.

Figure 2B:
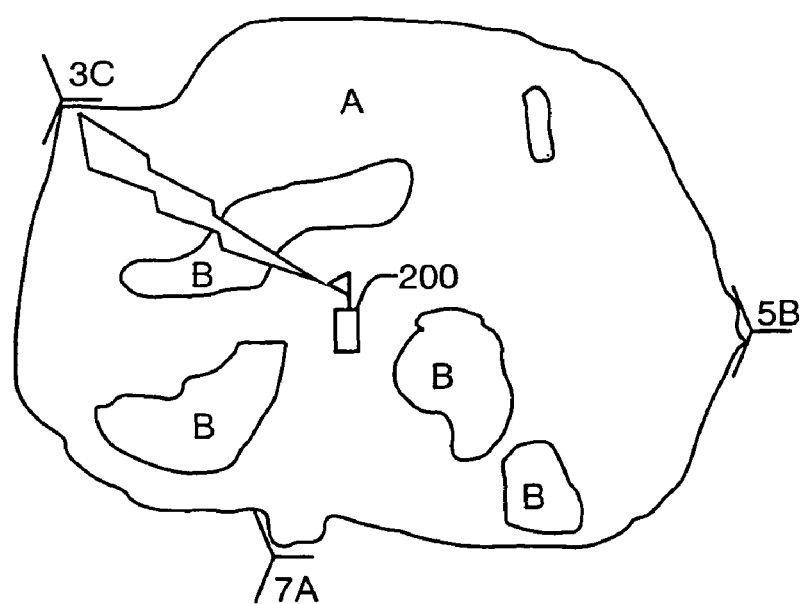
FIG. 2B illustrates how the invention can be used to reduce the number of active set members.

FIG. 2B illustrates an example of how the present invention can be used to improve this situation, by simply adding a directional antenna to the mobile unit 200 and slightly modifying the standard soft hand-off processing therein.

It can be appreciated that regions, associated with locations where three or more members in the active set have been eliminated entirely, and the area of region B with two candidates have been reduced markedly.

Figure 3:
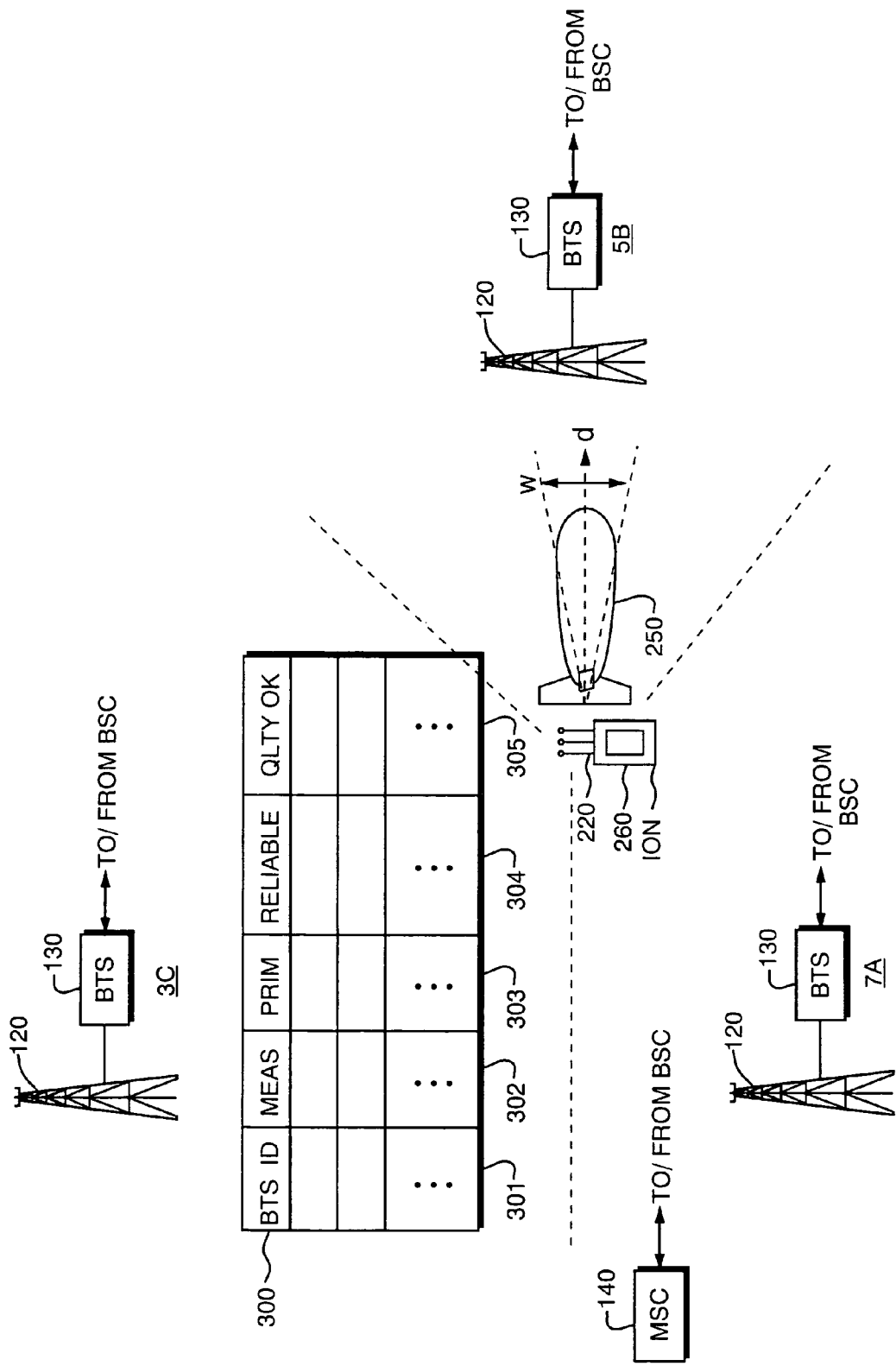
FIG. 3 is a more detailed view of an exemplary situation with a mobile unit making use of a directional antenna to reduce the members of an active set.

FIG. 3 will now be used to illustrate a more detailed description of a preferred embodiment of the invention to achieve a reduction in the number of members of the active set. FIG. 3, is in effect, a more detailed view of the situation in area 100 adjacent where three sectors 3C, 5B, and 7A converge. Each sector has an associated sector antenna 120 and Base Transceiver Station (BTS) 130; the BTSs 130 are all connected to a centralized Mobile Switching Center (MSC) 140 in a manner that is well known in the art. The BTSs 130 and MSC 140 cooperate with the mobile unit 200 to perform Mobile Assisted Hand-Off (MAHO) procedures, as are well known in the art.

With the present invention however, the mobile unit 200 has associated with it a directional antenna array 220. The directional antenna 220, which may for example be a multi-element array, allows for the mobile unit to produce an antenna pattern 250 that has directional and/or other modifiable characteristics. For example, a direction can be changed for the antenna pattern 250 such that the mobile unit may point to any of a number of directions around the 360° azimuth. In certain embodiments, other parameters of the antenna pattern 250, such as its beamwidth, W, can be modified.

More particularly, mobile unit 200 performs a process 260 to complete various aspects of soft hand-off. In connection with this processing, a so-called active set list 300 is maintained. Here the active set 300 is a list containing the identifier of base station sectors presently visible, such as determined by taking certain measurements on pilot signals such as the aforementioned $E_c/I_o$. This information, including a base station sector ID 301 and measurement energy value 302 has been kept in the active list 300 associated in the prior art.

However, with the present invention, additional parameters are kept with the active set 300. These may include for example, at least a "primary" indicator associated with one member of the active set, a reliability measure 304, and a quality indicator 305. The primary 303, reliability 304, and quality indicator 305 can be single bit data values indicating specific additional information associated with each member of the active set 300.

Figure 4:
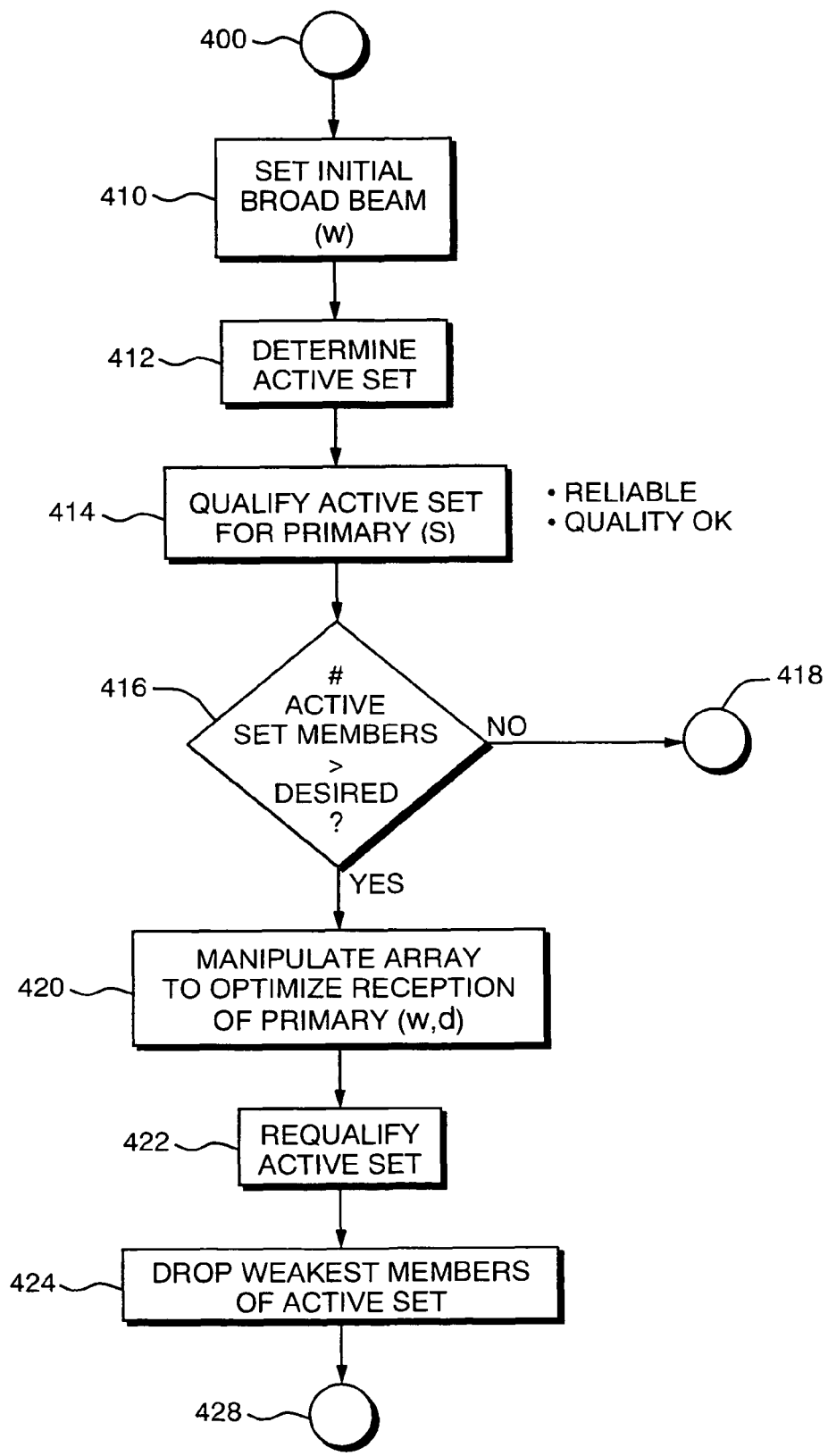
FIG. 4 is a detailed flow chart of the active set qualification process.

FIG. 4 is a flowchart of operations illustrating how the present invention can be used to control the operation of the sector antenna so as to reduce the number of members of the active set.

From an idle state 400, a first state 410 is entered in which the controller 260 manipulates the array 220 so as to have an initial broad beamwidth setting. This step can, for example, set the array in an omni-directional mode. However, it should be understood that the initial state here may not require an omni-directional (that is fully with 360° azimuthal coverage) but rather be some smaller angle, such as 120°.

In a next state 412, the active set list 300 is determined. This is done in a manner well known in the prior art, by detecting the existence of various pilot channel signals in the vicinity of the handset 200 (measuring their forward link $E_c/I_o$) and qualifying them to see if they pass a Pilot Detection Threshold for a period of time ($T_{ADD}$). At a point when the qualification process is complete, those pilot signals passing the qualification test are reported via a Pilot Signal Measurement Message (PSMM) sent to the Network. This causes further messages to update the active set lists managed by the MSC.

At this point, however, according to the invention, the active set 300 is examined to determine whether one or more primary pilot channels can be identified. Thus, after using various criteria to determine reliability of the base pilot channel signals, a reliability measure is stored as reliability data 304. A received pilot signal's reliability may be judged by one of many different methods. All of these measures typically utilize a measure of how close that signal is to a noise floor composed of interference from other sectors and thermal noise. One such measure may, for example, be Received Signal Strength Indication (RSSI) type measurement. However, correlated power, $E_c$ may also be used by estimates of noise based upon actual measurement and/or estimated calculations may be used from these parameters a variation measure of the signal strength or correlated power can be used as a reliability measure. Other attempts to measure a signal to noise ratio may also be used to determine reliability.

In any event, after determining the reliability measures 304 associated with each of the pilot channels in the active set 300, one member of the active set is chosen as the primary member.

In state 416, if the number of active set members is not greater than the number of desired members, a test is made. Specifically, if the number of active set members is only two, then perhaps no additional processing is necessary and the process can terminate in state 418. This minimum number may be a fixed minimum number, but is preferably determined by the minimum number of active set members that result in a desired quality level. The minimum number is typically greater than one, to mitigate a fast fading situation.

However, if the test in state 416 indicates that three or more candidate members are in the active set, it is advantageous to perform additional processing.

Specifically, in state 420 the antenna array in the mobile unit 220 is now manipulated to optimize reception of a designated primary signal. For example, the array 220 can be modified by narrowing its beamwidth W and/or changing its direction D to optimize reception of the pilot channel that was designated as the primary. By steering the array in this fashion, an effect will occur such that the signal power associated with the other pilot channels from other base station sectors will be reduced.

As shown in the particular example in FIG. 3, the active set qualification process 14 resulted in entries being made for each of the base station channel sectors 3C, 5B, and 7A as members of the active set 300. Each of these base station pilot channels was thus visible to the mobile unit when it was in an omni-directional mode. However, upon determining that reliability measure of base station sector 5B was greatest, the antenna array is manipulated to steer its pattern in the direction of sector 5B, whereby signals received from sectors 3C and 7A are now effectively attenuated.

Next, in step 422, with the array 122 set to an optimized reception for the primary, requalification procedures are preformed on the active set. Specifically, measurements are again taken for members of the active set to see if they qualify to remain as members. In many instances therefore, given that the antenna is now set to a directional mode and that signals received from other sectors 3C and 7A are attenuated, they are likely not to pass the $T_{ADD}$ processing. They therefore should be reported as such to the MSC in a PSMM message, which will then cause them to be dropped from the active set. In state 424 the active set has now been reduced and processing can terminate in state 428.

In this manner it can be seen how these additional steps can be used to disqualify pilot channels that are no longer necessary for maintaining a reliable connection. This frees up channel resources to be utilized by other mobile units.

Figure 5:
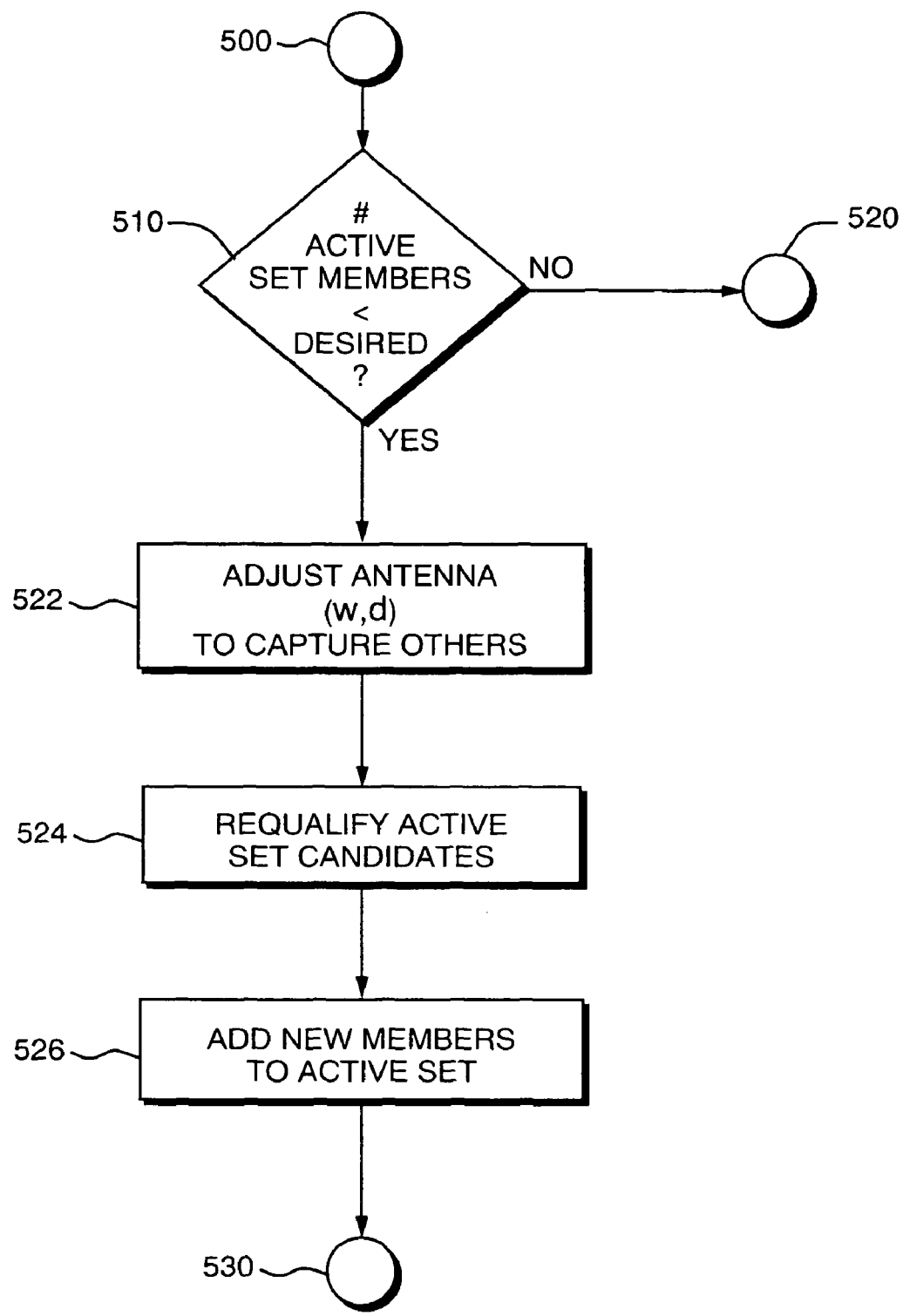
FIG. 5 is a flow chart of operations performed when the number of active set members is less than desired.

In another embodiment, additional processing occurs as in FIG. 5, in order to assure that at least a minimum number of members are always associated with the active set.

From an idle state 500, a test is periodically made to see if the number of members of the active set is less than a number of desired members. If it is not, then the active set membership is adequate and this branch of processing can terminate in state 520. If, however, a minimum number of active set members is not present, then processing will continue. This may occur if there are no members of the active set or only one active member, and it is desirable to determine if additional members can be added so that soft hand-off processing can be performed when appropriate. In state 522, the antenna array parameters are adjusted (W or D) so that additional base station transceivers D might be captured. This can be done by manipulating the direction or more probably the beamwidth W of the antenna pattern 250. So, for example, the antenna pattern might in state 522 be broadened to a beamwidth of 180°. This will permit, in state 524, the detection of other pilot channels in the area, pilot channels of both base stations 5B and 7A.

Thus, by forcing a change in the antenna pattern, a minimum number of members can also be maintained in an active set 300. This can be advantageous when the currently members are deemed unreliable, so that by effectively or manipulating the antenna array, additional pilot channel signals are visible.

Figure 6:
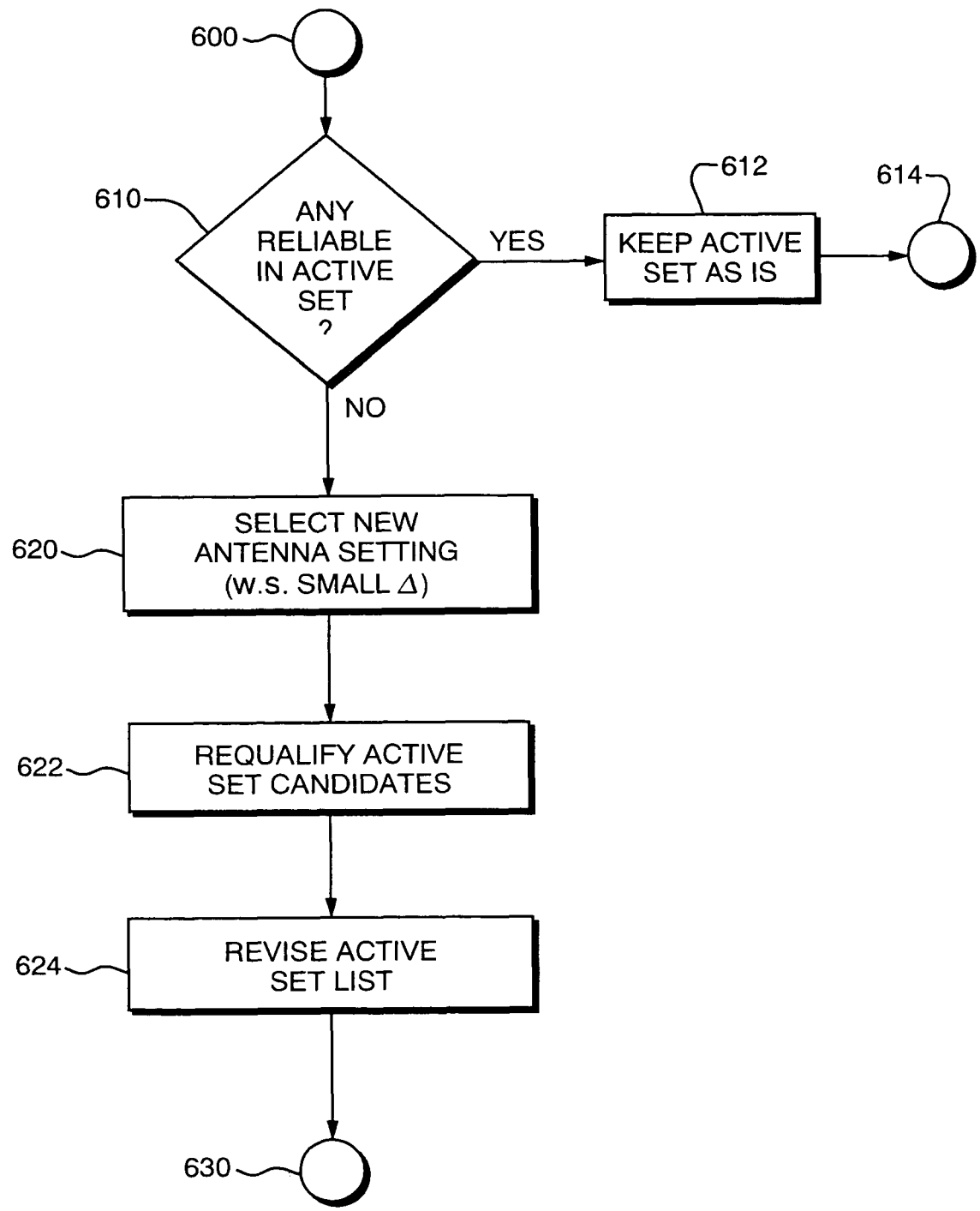
FIG. 6 is a flow chart of operations performed when there are an insufficient number of reliable members in the active set.

FIG. 6 illustrates further processing that may be utilized. From an idle state 600, a test is made in state 610 to determine if there are any reliable members of the active set. If there are, then the active set is maintained as in state 612 and processing of this branch terminates in state 614.

However, if there are no signals that meet a reliability test, then a state 620 is entered. Here, the array 120 is manipulated so that additional signals may be visible from the subscriber unit 200. For example, the array might be steered slightly in one direction or another from its present setting and/or its beamwidth slightly broadened. Thus, the antenna pattern is manipulated in such a way that it is possible to capture additional base station pilot channels, but, without removing specific pilot channel which is presently being utilized as the primary active set member. The net effect in this series of steps is this if a candidate angle for the array can be slightly changed, and result in increased reliability for the currently members of the active set, then a higher quality signal will be received, and therefore performance improved.

While this invention has been particularly shown and described with references to preferred embodiments thereof, it will be understood by those skilled in the art that various changes in form and details may be made therein without departing from the scope of the invention encompassed by the appended claims.

What is claimed is:

1. A mobile communication unit configured to manage an active set of radio channels used in soft hand-off processing, comprising:
   an adaptive antenna configured to detect pilot channel signals in a vicinity of the mobile unit, each pilot channel being transmitted from a separate base station; and
   a controller configured to:
      determine, based on a first parameter related to signal strength measurements of the pilot channel signals over a period of time, whether each of the separate base stations should be maintained in an active set;
      determine at least one parameter additional to the first parameter related to reliability of the pilot channel signal of each base station in the active set;
      select the pilot channel signal of one base station in the active set as a primary signal based on the at least one additional parameter;
      make a change in an antenna pattern of the adaptive antenna to optimize reception of the primary signal; and
      requalify the active set of base stations with the changed adaptive antenna pattern.

2. The communication unit of claim 1 wherein the adaptive antenna is a directional antenna array.

3. The communication unit of claim 2 wherein the adaptive antenna is a phased array.

4. The communication unit of claim 3 wherein the adaptive antenna uses multiple receivers and signal combiners.

5. The communication unit of claim 1, wherein the controller is further configured to: determine that more than one active set member is a reliable connection based on the at least one additional parameter for each of the active set members; and change the antenna pattern of the adaptive antenna to reduce a number of radio channel signals received.

6. The communication unit of claim 1 wherein the at least one additional parameter is selected from the group consisting of received signal strength indication, correlated power, and measurements of signal to noise ratio.

7. The communication unit of claim 1, wherein the controller is further configured to: adjust the antenna pattern to capture additional radio signals to be possible members of the active set; and requalify the active set members on a condition that a number of members of the active set is less than a predetermined number.

8. The communication unit of claim 1, wherein the controller is further configured to: select a new setting for the adaptive antenna; and requalify active set members on a condition that a member of the active set is not reliable.

9. The communication unit of claim 1, wherein the controller is further configured to: steer the antenna such that additional radio signals are detected on a condition that a member of the active set is not reliable.

10. The communication unit of claim 1, wherein the controller is configured to: periodically select a new antenna pattern such that criteria for receiving at least one radio signal is not satisfied, on a condition that candidate pilot channel signals are determined unreliable but of sufficient quality.

\* \* \* \* \*